United States Patent [19]
Garland

[11] Patent Number: 5,509,054
[45] Date of Patent: Apr. 16, 1996

[54] COMMUNICATION SWITCHING SYSTEM

[76] Inventor: Stuart M. Garland, 5905 W. Keeney Ct., Morton Grove, Ill. 60053

[21] Appl. No.: 155,047

[22] Filed: Nov. 19, 1993

Related U.S. Application Data

[62] Division of Ser. No. 60,322, May 11, 1993.
[51] Int. Cl.⁶ .................................................. H04M 11/00
[52] U.S. Cl. ............................................ 379/106; 379/107
[58] Field of Search .................................. 379/93, 96–98, 379/102, 104–107

[56] References Cited

FOREIGN PATENT DOCUMENTS 0474407  3/1992  European Pat. Off. ............... 379/106

Primary Examiner—Wing F. Chan

[57] ABSTRACT

A communication switching system, in addition to normal services i.e., voice, FAX, data, etc., provides secure bi-directional communication between the facilities of a utility and specialized voice and/or data CPE which are served by an on-premises Telemetry Interface Unit. A Central Office Service Unit (COSU), which is connected to a switching system by Utility Telemetry Trunks (UTT), is employed as an interface between utilities and one or more communication switching systems. The COSU provides detailed calling instructions and data which define the services to be rendered by the switching system. The detailed instructions serve to: define the source and character of the signals to be used to alert the TIU; sub-addresses of CPE served by a TIU; conduct of line supervision; permitted supervisory state of a called line at time of call to a TIU; broadcast of messages, etc.

19 Claims, 15 Drawing Sheets

COMMUNICATION SWITCHING SYSTEM

This application is a Divisional Application of U.S. application Ser. No. 08/060,322 which was filed on May 11, 1993.

TECHNICAL FIELD

This invention relates to improved apparatus and methods for controlling a communication switching system to implement a variety of new customer services while retaining all of the voice services which can be provided by a modern telephone switching system.

BACKGROUND OF THE INVENTION

Through the years, Telemetry Interface Units (TIU) for a modest number of telemetry customer services e.g., reading of utility meters, electric load shed control, alarms, etc. have been connected to dedicated Customer telephone lines; and alternatively have been connected to shared Customer telephone lines in parallel with: standard telephone station equipment, FAX machines, modem based applications, etc. In the instances where dedicated lines are employed, normal power ringing can be employed to access the TIU. Where shared lines are utilized, power ringing limited to one or two bursts is used to alert a TIU to initiate a call to a utility, and the users of normal telephone station equipment are directed not to answer a call until after a set number of bursts e.g., three. This mode of operation is comparable to arrangements in answering machines which answer after an established number of bursts of ringing. Since telemetry calls generally are received less frequently than normal telephone calls, a requirement that a customer listen for and wait for a set number of bursts of ringing before answering a telephone is a serious annoyance.

At least two prior art telemetry systems overcome this problem by connecting a utility controller to a TIU without the use of power ringing to alert the TIU. One such prior art system utilizes a Central Office Service Unit and the "no-test" trunks of a switching system to provide telemetry services without the use of power ringing. A "no-test" trunk bypasses the normal switching network and provides a metallic connection to a subscriber line without making a line busy test; and without subsequent supervision of the busy-idle state of the line. Testing of customer lines for faults and verification for speech on a connection, by design, are the intended and primary uses of "no-test" trunks. No-test trunk facilities are both expensive and slow, and in the absence of their use in telemetry calls, "no-test" trunks are provided in very small numbers i.e., two per switch. Each such switch may serve several hundred-thousand lines. Another system for access of CPE is described in my U.S. Pat. No. 5,189,694 which issued on Feb. 23, 1993. That patent discloses a "no-ring" method of accessing CPE telemetry equipment through a normal switching network without reliance on the use of "no-test" trunks. The method is described in the context of an illustrative embodiment which utilizes a Central Office Service Unit (COSU) as an interface between Utility Controllers (UC) of one or more third party providers and Utility Telemetry Trunks (UTT) of one or more switching networks. A third party provider may be: a utility e.g., gas, water, electric; or an Enhanced Service Provider (ESP) e.g., a source of messages, a provider of services to more than one utility, etc. Bi-directional communication between a COSU and a Utility Controller (UC) may be accomplished over dial-up or dedicated facilities. For end-to-end communication of responses from TIU's connected to one or more switching offices and a UC, the COSU transmits the responses to a UC on a multiplexed basis. The UTT are standard, digital or analog, inter-office trunks. The switch ports to which the UTT are connected are assigned a class of service which dictates that for calls originated over the UTT, the Stored Program Control Processor (SPCS) of the switching system effects connection of the COSU to the subscriber line designated by the COSU without applying power ringing. Furthermore, the connection is established without regard for customer features of the called line e.g., call forwarding. Subsequently, the COSU transmits an alerting tone or other signal, over the thus established connection, to alert the TIU; and the COSU completes a digital connection to the Utility Controller to permit bi-directional telemetry communication between a Utility Controller and a TIU. In the system of my U.S. Pat. No. 5,189,694, the COSU transmits two messages to the connected switching system over a UTT. Each message is in standard trunk signalling format which comprises: "KP"+ DATA+"ST" where "KP" for "Key Pulse" is a beginning of message signal and "ST" for "Start" is an end of message signal.

In a system which implements U.S. Pat. No. 5,189,694, the first message comprises:

KP+ANI II+ANI+ST.

In the first message, ANI II is a control code which directs that communication with a TIU is to be either in the off-hook transmission mode or in the on-hook transmission mode; and ANI identifies the calling number.

The second message comprises:

KP+7/10DN+ST(ST', ST", ST"')

In the second message, 7/10DN indicates a seven digit or ten digit called number; and the "End of Message" signals ST, ST', ST", and ST"' each request that a connection to a subscriber line include a short burst of ringing. Since power ringing is not employed to alert the called CPE, the burst is required if the called number is served by a subscriber line carrier system. A Subscriber Line Carrier system may be referred to as either SLC™, a trademark of AT&T, or as a digital line carrier (DLC) system. As in the prior art, each of the "ST" signals defines a different time duration of the ringing burst to accommodate field conditions. The subscriber line carrier system employs a power ringing signal to select a time slot to serve a call, and a single short burst will not be passed on to the called station. The described use of a short burst of power ringing is disclosed in U.S. Pat. No. 5,243,644 which was issued on Sep. 7, 1993.

Although these prior art systems provide for "no-ring" access to a called customer line, responsibility for alerting the TIU, in both systems, is vested in the COSU. In the case of off-hook transmission by the TIU, supervision of the connected line for the duration of the connection is similarly vested in the COSU. However, in the case of on-hook transmission by the TIU, supervision of the connected line is retained by the SPCS.

The limited roles of the SPCS in the referenced prior art systems seriously limit the types of telemetry services which can be rendered by those systems and precludes concatenation of other SPCS based applications e.g., "Analog Display Services Interface" with telemetry services. "Analog Display Services Interface" are described in *Technical Reference TR-NWT*-001273, *Issue* 1, dated December 1992 as published by Bell Communications Research (Bellcore)

DISCLOSURE OF THE INVENTION

In the illustrative embodiment of my present invention, a telemetry system comprises a Central Office Service Unit (COSU) as an interface between Utility Controllers (UC) of one or more Utilities and/or Enhanced Service Providers and Utility Telemetry Trunks (UTT) of one or more switching networks, the switch ports to which the UTT are connected are assigned a class of service which dictates that for calls originated over the UTT, the Stored Program Control Processor (SPCS) of the switching system expects to receive coded instructions (TFI) to the SPCS and data for implementing a plurality of services under control of the SPCS.

In the illustrative embodiment of my invention, the instructions (TFI) to the SPCS and the data required to implement the instructions are transmitted to the SPCS in at least two sequential messages in standard trunk signaling format. For certain of the instructions, additional data required to implement those instructions are transmitted to the SPCS in a third message.

In the illustrative embodiment of my invention, in a first message of the form "KP+TFI+ANI+ST (ST', ST", ST'")", TFI serves to define:

the manner of alerting the called TIU;

requested SPCS functions;

an optional sub-address to select a particular CPE served by the called TIU;

ANI is the Billing Directory Number; and the "End of Message" signals, ST, ST', ST", ST'" define the number of digits in the sub-address.

In accordance with my invention, the manner of alerting a TIU is defined as to both the source: SPCS or COSU; and the character of the specified alerting signal to be employed: power ringing, suppressed ringing, tone, etc.

In accordance with my invention, the SPCS functions indicate whether or not the SPCS is to maintain line supervision for i.e., look for Off-Hook and On-hook occurrences for the duration of a call.

In accordance with my invention, the SPCS may invoke other SPCS based activities e.g., the "Analog Display Services Interface" referenced earlier herein.

In accordance with my invention, certain of the SPCS functions prescribe that a call can only be completed to a subscriber line that is idle (On-Hook state) at the time of the call; and other prescribe that a call can "barge-in" on an active line and thus be completed to a subscriber line that is engaged (Off-Hook state) at the time of the call. The barge-in" option permits completion of urgent priority data and voice activities between either a COSU or an enhanced service provider (ESP) and CPE even though the CPE is engaged in voice or other activities at the time of a "barge-in" call. For example, with "barge-in", emergency warnings, voice or data, which originates from a Utility of Enhanced Service Provider may be communicated to Costumer Premises Equipment for machine or human processing; and an operating test of CPE may be completed to a line which appears to be busy.

In the illustrative embodiment of my invention, in a second message of the form "KP+7/10DN/Directive+ST(ST', ST", ST'")":

7/10DN is a 7 or 10 digit Directory Number of the called line;

Directive identifies information stored or to be stored by the SPCS e.g., a list of Directory Numbers to be called or the identifier of a previously stored list; and the "End of Message" signals, ST, ST', ST", ST'", as in the prior art, define the time duration of spurts of ringing required if power ringing is not employed to alert CPE and the called line is served by a Subscriber Line Carrier which requires power ringing to assign a time slot.

In the illustrative embodiment of my invention, in an optional third message of the form "KP+NNN+ST":

NNN is a variable length string of information e.g., a message to be sent to selected CPE, a list of directory numbers to be called, or a predefined function to be performed; and ST is a standard "End of Message" signal

DETAILED DESCRIPTION

Figure 1:
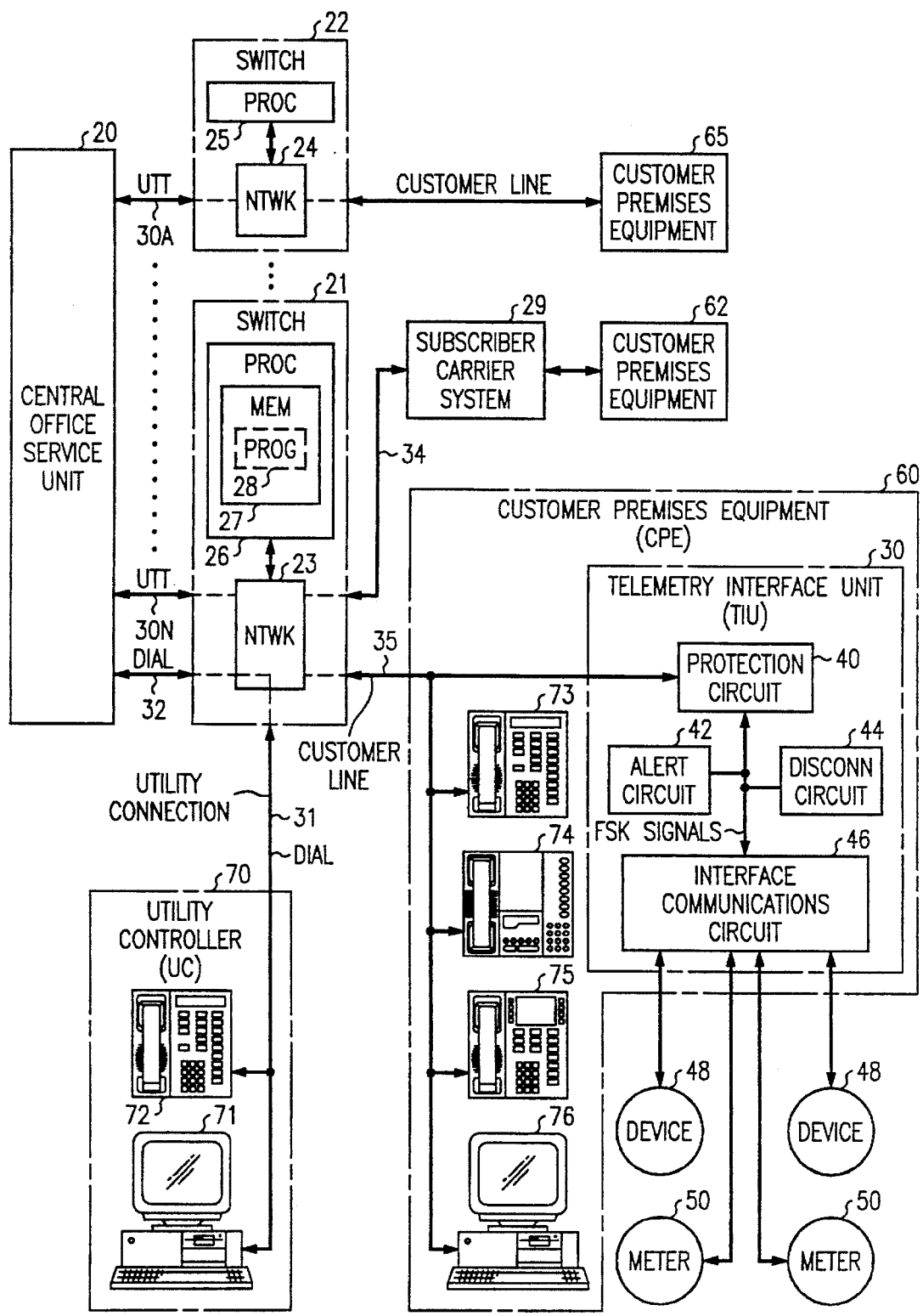
FIG. 1 is a block diagram of an illustrative system in accordance with my present invention.

The system of FIG. 1 provides for secure hi-directional communication between a Utility Controller 70 and a Telemetry Interface Unit (TIU) 30 of Customer Premises Equipment 60. The illustrative Utility Controller 70 comprises a computer terminal e.g., a Personal Computer 71 and a voice terminal 72. The illustrative Customer Premises Equipment 60 is connected to switching office 21 by subscriber Line 35. Customer Premises Equipment 60 comprises: voice terminals 73, 74, 75; personal computer 76; and Telemetry Interface Unit 30. Telemetry Interface Unit 30 comprises: protection circuit 40, alert circuit 42, disconnect circuit 44, and interface communications circuit 46. In the illustrative embodiment of FIG. 1, Telemetry Interface Unit 30 provides for communication with the devices 48 and meters 50. The devices 48 may be voice or telemetry units. Examples of voice devices are telephone, recorders, etc.; and remote controlled devices to effect changes in heating, cooling, etc. are examples of telemetry devices.

In FIG. 1, Central Office Service Unit (COSU) 20 is an interface between Utility Controllers (UC) 70 of one or more utilities and Utility Telemetry Trunks (UTT) 30–30N of one or more switching offices 21, 22. Although termed a Central Office Service Unit (COSU) herein, the functionality of a COSU, may be deployed either in a switching office 21, 22 or at a location remote from a switch e.g., the premises of a utility.

Bi-directional communication between a COSU and a Utility Controller 70 may be accomplished over dial-up or dedicated facilities. In FIG. 1, a typical dial-up connection comprises: utility connection 31, an unlabeled switched path through network 23 of switching office 21, and the dial path 32. For end-to-end communication of responses from TIU's which are served by one or more switching offices and Utility Controller 70, COSU 20 transmits the responses to a UC 70 on a multiplexed basis. UTT 30–30N are standard, digital or analog, inter-office trunks. The network ports to which the UTT are connected are assigned a class of service which dictates that for calls originated over a UTT, the Stored Program Control Processor (SPCS) e.g., Processor 27 of switching system 21 expects to receive coded instructions (TFI) to the SPCS and data for implementing a plurality of services under control of the SPCS. Examples of such services as set forth in Tables 1 and 2 are described later herein. The signalling sequences for implementation of such examples are shown in FIGS. 2–15. In the drawing and in the following description, the terms "SPCS" and "SWITCH" are used interchangeably with no intended difference in meaning except as may be understood from the context in which these terms are used.

TABLE 1

TELEMETRY FUNCTION IDENTIFICATION (TFI) - SWITCH FUNCTION CODES

| Function Code | Connect To | | Line Alert | | | Line Supervision | |
|---|---|---|---|---|---|---|---|
| | Idle Line | Busy Line | From Switch To Phone | From Switch To CPE | From COSU To CPE | Off-Hook Supervision | No Supervision |
| 000 | X | — | — | — | X | — | X |
| 001 | X | — | — | X | — | X | — |
| 002 | X | — | — | X | — | X | — |
| 003 | — | — | — | — | — | — | — |
| 004 | X | — | — | X | — | X | — |
| 005 | X | — | — | X | — | X | — |
| 006 | — | — | — | — | — | — | — |
| 007 | — | — | — | — | — | — | — |
| 008 | X | — | X | — | — | X | — |
| 009 | X | — | X | — | — | X | — |
| 010 | — | X | — | — | X | — | X |
| 011 | — | X | — | X | — | — | X |
| 012 | — | X | — | X | — | — | X |
| 013 | — | X | — | X | — | — | X |
| 014 | — | X | — | X | — | — | X |
| 015 | — | X | — | — | — | — | X |
| 016 | — | X | — | — | — | — | X |

| Function Code | Additional Data String | Activate Sw Process After CPE Off-Hook | Applications |
|---|---|---|---|
| 000 | — | — | Telemetry, AMR, ESP data to CPE |
| 001 | — | — | ESP data to CPE, Oper Sys test of CPE |
| 002 | — | ADSI | ESP data to CPE, Oper Sys test of CPE, ADSI |
| 003 | X | — | Load Broadcast List |
| 004 | X | — | Broadcast ESP data to CPE |
| 005 | X | ADSI | Broadcast ESP data to CPE/ADSI |
| 006 | X | — | Broadcast success or failure report |
| 007 | — | — | Request broadcast status |
| 008 | — | — | ESP Voice message to CPE |
| 009 | X | — | ESP Broadcast Voice message to CPE Barge-In cases |
| 010 | — | — | Telemetry, AMR, ESP data to CPE |
| 011 | — | — | ESP data to CPE, Oper Sys test of CPE |
| 012 | — | ADSI | ESP data to CPE, Oper Sys test of CPE, ADSI |
| 013 | X | — | Broadcast ESP data to CPE |
| 014 | X | ADSI | Broadcast ESP data to CPE/ADSI |
| 015 | — | — | ESP Voice message to CPE |
| 016 | X | — | ESP Broadcast Voice message to CPE |

TABLE 2

TELEMETRY FUNCTION IDENTIFICATION (TFI) - CPE ALERT CODES

| Alert Code | Alert Type | Application |
|---|---|---|
| 00 | No alert | COSU/ESP alert, AMR |
| 01 | Power Ring | Voice Messaging |
| 02 | CPE On-Hook Alert Signal | New Dual Tone Alert for On-Hook CPE |
| 03–05 | Dual Tones | CPE (TIU) Off-Hook alert codes |
| 06–08 | Dual Tones | CPE (TIU) On-Hook alert codes |

In FIG. 1, Utility Controller 70 originates calls to CPE by establishing a connection to Central Office Service Unit 20. COSU, for security, may limit the incoming call from UC 70 as a request for service, drop that call, and call UC 70 over another path. In any event, UC 70 advises COSU of the of service requested and the identity or identities of CPE to which the requested service is to be directed. In response to a request, COSU 20 initiates communication with an SPCS e.g., PROC 26 of office 21 to serve the request.

In the illustrative embodiment of FIG. 1, coded instructions termed Telemetry Function Instruction (TFI) and data required to implement the instructions are transmitted to the SPCS in at least two sequential messages in standard trunk signaling format. For certain of the instructions, additional data required to implement those instructions are transmitted to the SPCS in a third message.

In the illustrative embodiment of my invention, in a first message of the form "KP+TFI+ANI+ST (ST', ST", ST'")", TFI is of the form: XX YYY ZZZZ wherein:

XX=99 switch alert codes (table 2)

YYY=999 function codes (table 1)

ZZZZ=Up to 8 digits, in the range of 0 to 7. Each digit represents the first 3 bits of a binary string. The 8 digits combine to form a binary string of 24 bits representing 16,777,216 combinations to be used for device sub-addressing. Each ST digit in the first protocol string represents the presence of Z digits. For example, ST=two Z digits present, ST'=four Z digits present, ST"=six Z digits present, and ST'"=eight Z digits present. The variable number of Z digits is to reduce the transmission time of the protocol string. In addition, Recent Change procedures for updating translations can be used to allow or not allow the presence of Z digits thereby making the protocol more efficient.

As determined by Tables 1 and 2, TFI code serve to define:

the manner of alerting the called TIU;

requested SPCS functions;

an optional sub-address to select a particular CPE served by the called TIU;

ANI is the Billing Directory Number; and the "End of Message" signals, ST, ST',ST",ST'" define the number of digits in the sub-address.

In Table 2, the manner of alerting a TIU, as determined by the XX digits, is defined as to the character of the alerting signal to be employed: power ringing, suppressed ringing, tone, etc.

In Table 1, the SPCS functions, as determined by the YYY digits of a TFI, indicate: (a) the source of the alerting signal i.e., the switch or the COSU; (b) whether or not the SPCS is to maintain line supervision i.e., look for Off-Hook and On-hook occurrences for the duration of a call; (c) advise SPCS to expect "additional data" in a third data string; and (d) invoke other SPCS based activities e.g., "Analog Display Services Interface" functions referenced earlier herein. In the column of Table 1 labeled "To Phone" is to a voice device 48 of FIG. 1, which is under control of a TIU.

Additionally, as seen from Table 1, certain of the illustrative SPCS function codes (codes 000–009) prescribe that a call can only be completed to a subscriber line that is idle (On-Hook state) at the time of the call; and other function codes (codes 010–016) prescribe that a call can "barge-in" on an active line and thus be completed to a subscriber line that is engaged (Off-Hook state) at the time of the call. The "barge-in" option permits completion of urgent priority data and voice activities between either a COSU or an enhanced service provider (ESP) and CPE even though the CPE is engaged in voice or other activities at the time of a "barge-in" call. For example, with "barge-in", emergency warnings, voice or data, which originates from a Utility of Enhanced Service Provider may be communicated to Custom Premises Equipment for machine or human processing; and an operating test of CPE may be completed to a line which appears to be busy.

In the illustrative embodiment of my invention, in a second message of the form "KP+7 /10DN/Directive+ST (ST',ST",ST'")":

7/10DN is Directory Number of the called line;

Directive identifies information stored or to be stored by the SPCS e.g., a list of Directory Numbers to be called or the identifier of a previously stored list; and the "End of Message" signals, ST, ST', ST", ST'", as in the prior art, define the time duration of spurts of ringing required if power ringing is not employed to alert CPE and the called line is served by a Subscriber Line Carrier which requires power ringing to assign a time slot.

In the illustrative embodiment of my invention, in an optional third message of the form "KP+NNN+ST":

NNN is a variable length string of information e.g., a message to be sent to selected CPE, a list of directory numbers to be called, or a predefined function to be performed; and ST is a standard "End of Message" signal.

Signaling on the Utility Telemetry Trunks is described in terms of Multi-frequency (MF) digits. If the third protocol string contains other than digits 0–9 (ASCII or binary data), a data link (I/O channel) may be required to input the information. This protocol can also be converted to any other digital switch input technique such as a PRI link.

In the following examples, it is assumed that the called CPE is not served by a Subscriber Line Carrier; therefore, in the second message strings, the optional start codes ST', ST", and ST'" are not employed.

1. Telemetry, Automatic Meter Reading, ESP data to/from CPE

The protocol for this example is:

KP+TFI+ANI+ST

KP+DN+ST where:

| TFI | = | Alert | Function | Sub-address (see Tables 1 and 2) |
|---|---|---|---|---|
| | | 00 | 00 | 00 |

Alert=00 indicates there is no alert from the switch

Function=000 indicates the COSU is to alert the CPE, the switch is to return Busy if the line is Busy, there is no switch supervision of the line, and there is no third information string.

sub-address=00 indicates there is no sub-address to be sent to the CPE. The switch does not alert the CPE, therefore there are no-sub-addresses from the switch.

The sub-addresses, if any, must be supplied by the COSU.

DN=Destination Directory Number

ANI=Billing telephone number

ST=Indicates only two sub-address digits are present.

A Recent Change field can be created that would indicate No sub-address digits present thereby decreasing the time to send the digits to the switch.

For inbound applications, the sub-address field in the TFI may be used to identify the CPE sub-address to the utility/ ESP. The inbound alert is an implied alert(Off-Hook) to the COSU.

Figure 2:
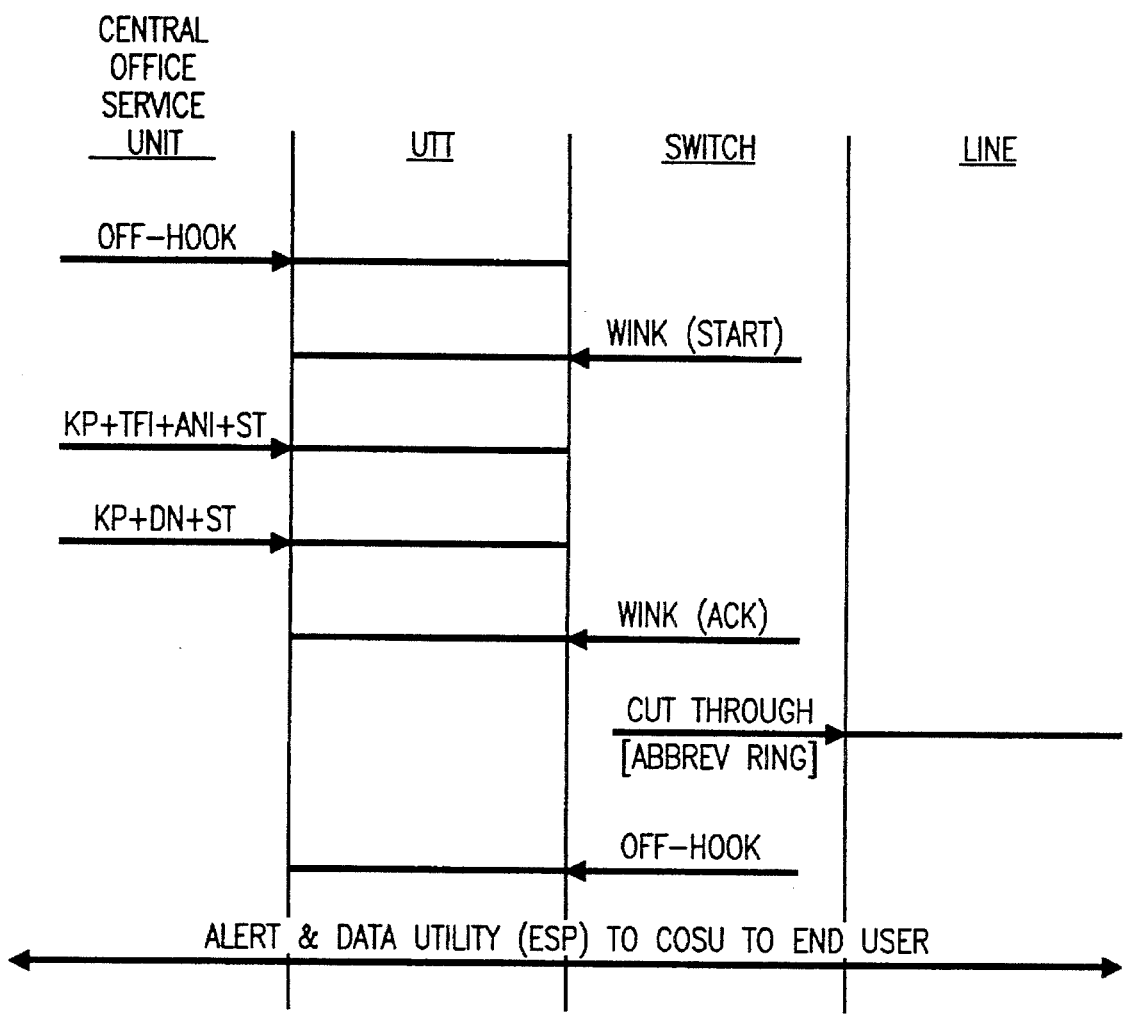
FIGS. 2–15 are signaling sequence diagrams for the system of FIG. 1.

Refer to FIG. 2.

For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch cuts through to the end users line and returns Off-Hook to the COSU. The COSU alerts the TIU (CPE) and exchanges data. The COSU and/or TIU (CPE) is responsible for detecting the end user going Off-Hook and taking down the telemetry call.

Figure 3:
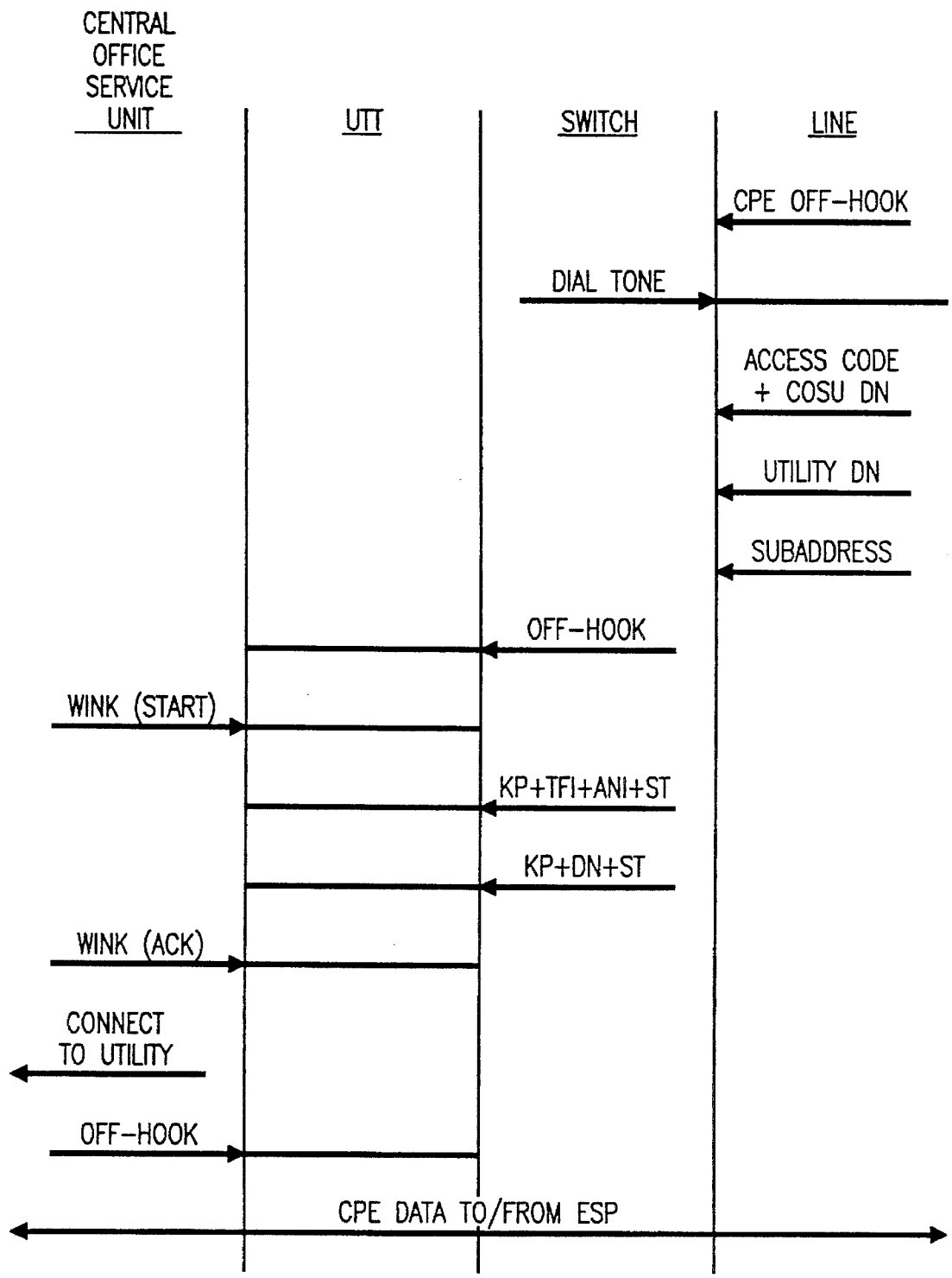

Refer to FIG. 3.

Inbound applications are used, for example, by a CPE device to report status after a load shed command or by a CPE device requesting a new download after finding a memory parity error. In this case, the CPE would go Off-Hook, dial the telemetry access code, the destination Directory Number of the COSU, the destination Directory Number of the utility, and include its sub-address. In this case, the switch initiates the UTT connection by going Off-Hook. The COSU responds with a Wink (Start). As seen in FIG. 3, the switch sends two strings of information to the COSU. The first string comprises: (a) ANI, which is the identity of the calling line, and (b) the sub-address of the calling device. The two strings of information are acknowledged by a Wink (ACK). The COSU connects to the utility/ESP and returns Off-Hook to the switch. The communications protocol between the COSU and the utility/ESP can contain the ANI (calling number) and the sub-address of the device. Data is exchanged between the CPE and utility/ESP. The COSU and/or CPE is responsible for detecting the end user going Off-Hook and taking down the telemetry call. It is not sufficient for the CPE to go On-Hook since the end user is already Off-Hook. If the end user has Call Waiting assigned to the line, the telemetry call will not activate Call Waiting or Caller ID on Call Waiting (CIDCW).

2. Switch/ESP/Utility data to CPE"

This example is similar to the first example except the switch provides the CPE alert,-sub-addressing, and an Off-Hook signal to the COSU which indicates the CPE went Off-Hook. Applications for this technique are meter reading and switch initiated applications. For example, in a meter reading application, since the CPE has gone Off-Hook, the switch and therefore the COSU will know the TIU (CPE) has gone Off-Hook. The TIU/COSU is still responsible for call termination when the end user goes Off-Hook. Since the switch has control of the CPE alert function and-sub-address, the switch can internally initiate calls for such things as broadcast to various TIU (CPE) devices, Operations Systems testing of CPE, Operations Systems or service order initiated changes to CPE, or other switch initiated communications functions.

The protocol for this example is:

KP+TFI+ANI+ST

KP+DN+ST where:

| TFI | = | Alert | Function | Sub-address (see Tables 1 and 2) |
|---|---|---|---|---|
| | | 02 | 001 | 05 |

Alert=02 indicates the switch is to sent a CPE On-Hook alert signal [similar to the CPE Off-Hook alert signal (CAS) in TR 30].

Function=001 indicates that, if the CPE is On-Hook, the switch is to alert the CPE based on the alert signal defined above, the switch is to return Busy if the line is Busy, an Off-Hook is to be returned from the CPE after it is alerted and the sub-address received, and there is no third information string.

Sub-address=05 indicates a sub-address of 5 will be sent to the CPE (indicating, for example, extension 5 at the specified Directory Number) after the CPE On-Hook alert signal. Upon receiving the sub-address the CPE (at sub-address 5) will go Off-Hook.

ST (first string)=indicates only two sub-address digits are present

Using other alert codes will allow the switch to alert other specialized CPE on the line when necessary. For example, special alert codes can be used to differentiate between different CPE devices.

Figure 4:
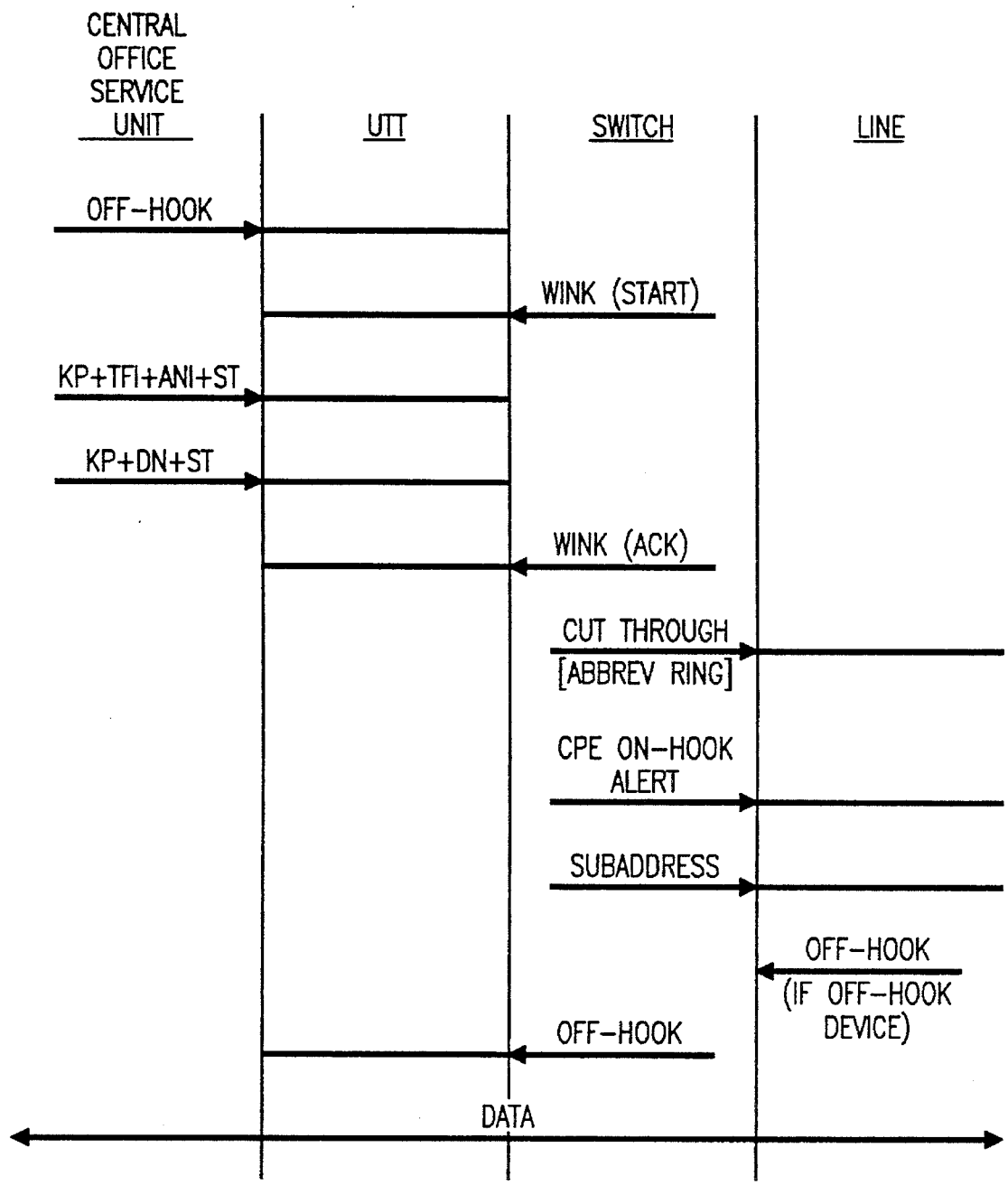

Refer to FIG. 4.

For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch cuts through to the end user's line, sending abbreviated ringing, if instructed. The switch then sends the CPE On-Hook alert signal and sub-address. If the CPE device is present, the CPE goes Off-Hook. The switch returns Off-Hook to the COSU. The COSU and CPE exchange data. The COSU and/or CPE is responsible for detecting the end user Off-Hook and causing the call to be taken down.

If the CPE is already Off-Hook, Busy will be returned to the COSU since there is no knowledge as to which CPE sub-address is Off-Hook. Rather than provide a false indication of the correct device being Off-Hook, a Busy is returned.

After the switch returns Off-Hook to the COSU, data is exchanged between ESP and CPE.

If the end user has Call Waiting assigned to the line, the telemetry call will not activate Call Waiting or Caller ID on Call Waiting (CIDCW).

A Barge-In case is provided which allows the ESP to barge-in on existing conversations.

3. Switch/ESP/utility data to CPE—ADSI type CPE

This example is similar to the previous example except the protocol specifies additional switch capabilities the telemetry feature must interact with to complete the call. In this example, the telemetry feature, after providing the connection, the new CPE On-Hook alert signal and-sub-address to the CPE, gives line side control to the ADSI capability. The ADSI capability provides the ADSI alert. The telemetry feature returns Off-Hook to the COSU. The message is delivered to the ADSI CPE. If the line is already Off-Hook and Call Waiting is active, the CIDCW process is activated.

The protocol for this example is:

KP+TFI+ANI+ST

KP+DN+ST where:

| TFI | = | Alert | Function | Sub-address (see Tables 1 and 2) |
|---|---|---|---|---|
| | | 02 | 002 | 05 |

Alert=02 indicates the switch is to send a new CPE On-Hook alert signal (similar to the CPE Off-Hook alert signal (CAS) defined in TR 30).

Function=002 indicates that, if the CPE is On-Hook, the switch is to alert the CPE based on the alert signal defined above, the switch is to return Busy if the line is Busy, an Off-Hook is to be returned from the CPE after it is alerted and the sub-address is received, and there is no third information string. The call is Call Waited if the CPE is Off-Hook.

Sub-address=05 indicates a sub-address of 5 will be sent to the CPE (indicating, for example, extension 5 at the Directory Number specified) after the CPE On-Hook alert signal. Upon receiving the sub-address the CPE will go Off-Hook.

ST (first string)=indicates only two sub-address digits are present.

Figure 5:
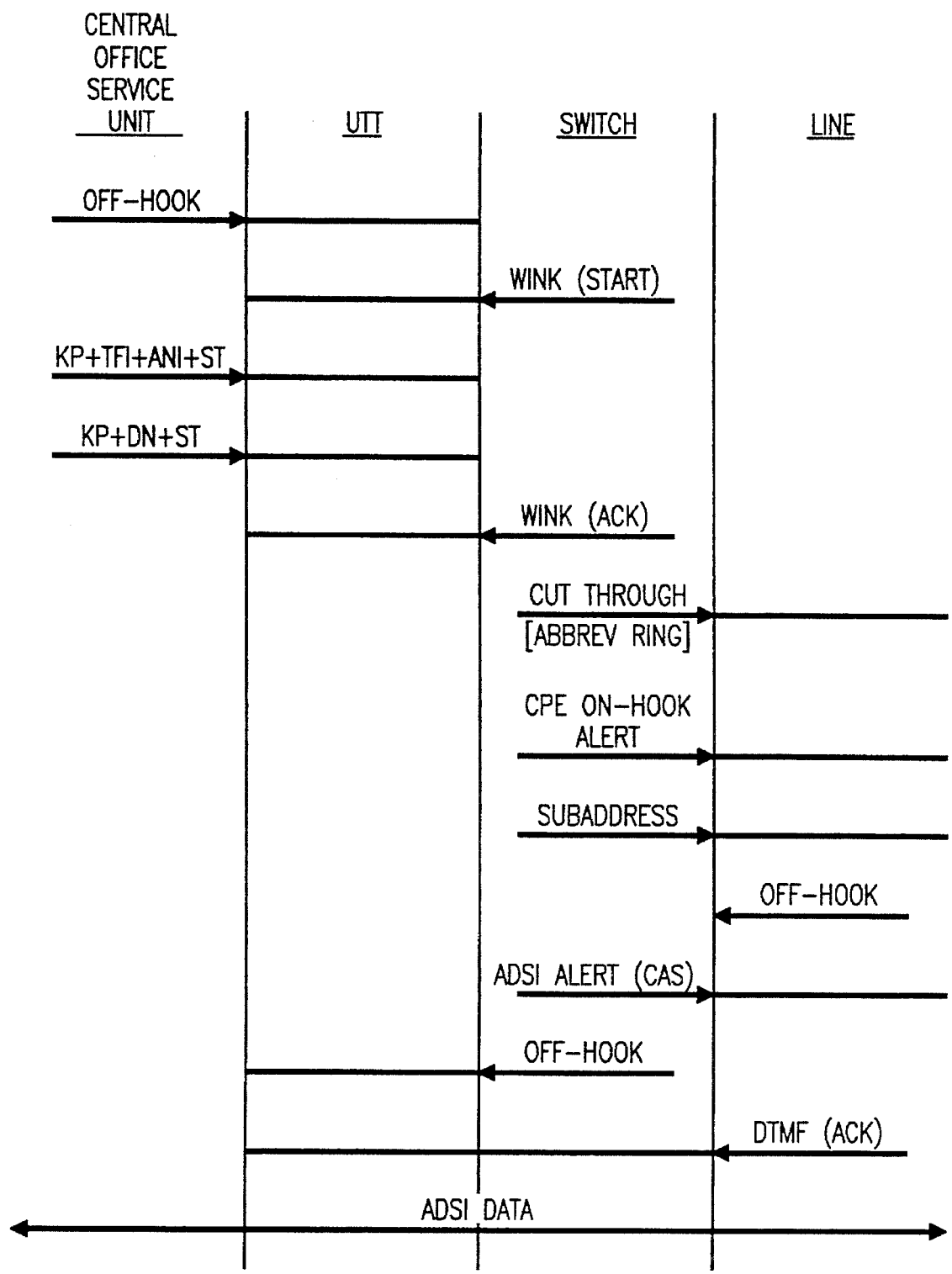

Refer to FIG. 5.

For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch cuts through to the end user's line, sending abbreviated ringing, if instructed. The switch sends the CPE On-Hook alert signal and sub-address. If the CPE is available, the CPE goes Off-Hook. The switch sends the ADSI alert signal (CAS) and Off-Hook is returned to the COSU. The ADSI CPE sends the DTMF (ACK), if available. This DTMF signal is transmitted to the COSU. ADSI data is exchanged between the ESP and CPE. The COSU/CPE is responsible for terminating the telemetry call.

If the CPE is already Off-Hook, and Call Waiting is not assigned to the line, Busy will be returned to the COSU.

If the end user has Call Waiting assigned to the line, the telemetry call will activate Caller ID on Call Waiting (CIDCW), using the CIDCW process. The telemetry feature will return Off-Hook to the COSU when the end user flashes for the waited call.

As discussed in an earlier example, the switch can internally initiate calls to the CPE providing communications for internal processes. conversations.

4. Load/Delete Broadcast List

This example defines a method to load or delete a list of Directory Numbers, alert codes, and sub-addresses into the switch for later use with the broadcast capability. This list of information is to be received by the switch in the third information string. If this third information string only contains the digits 0 through 9, MF signaling can be used otherwise a data port or I/O channel must be used.

This information string is stored in the switch memory until it is required for switch use or transmission to the CPE.

The protocol for this example is:

KP+TFI+ANI+ST

KP+MM+ST

KP+NNNN+ST where:

TFI = Alert Function Sub-address (see Tables 1 and 2)
00 003 00

Alert=00 indicates no alert is sent by the switch.

Function=003 indicates that the information contained in the third information string is to be considered a list of Directory Numbers (with alert codes and sub-addresses) and stored in the switch memory for later use.

Sub-address=00 indicates there are no sub-addresses to be sent to the CPE.

MM=indicates the broadcast list identifier. For example, 01 would identify list 1 and 02 would identify list 2.

NNNN=Directory Number list with alert codes, sub-addresses, and ringing durations, if applicable. An example of such a list is: [Alert Code 1, DN 1, Sub-address 1; Alert Code 2, DN 2, Sub-address 2; . . .]

A null third information string (KP+ST) implies "delete list defined as list MM".

Figure 6:
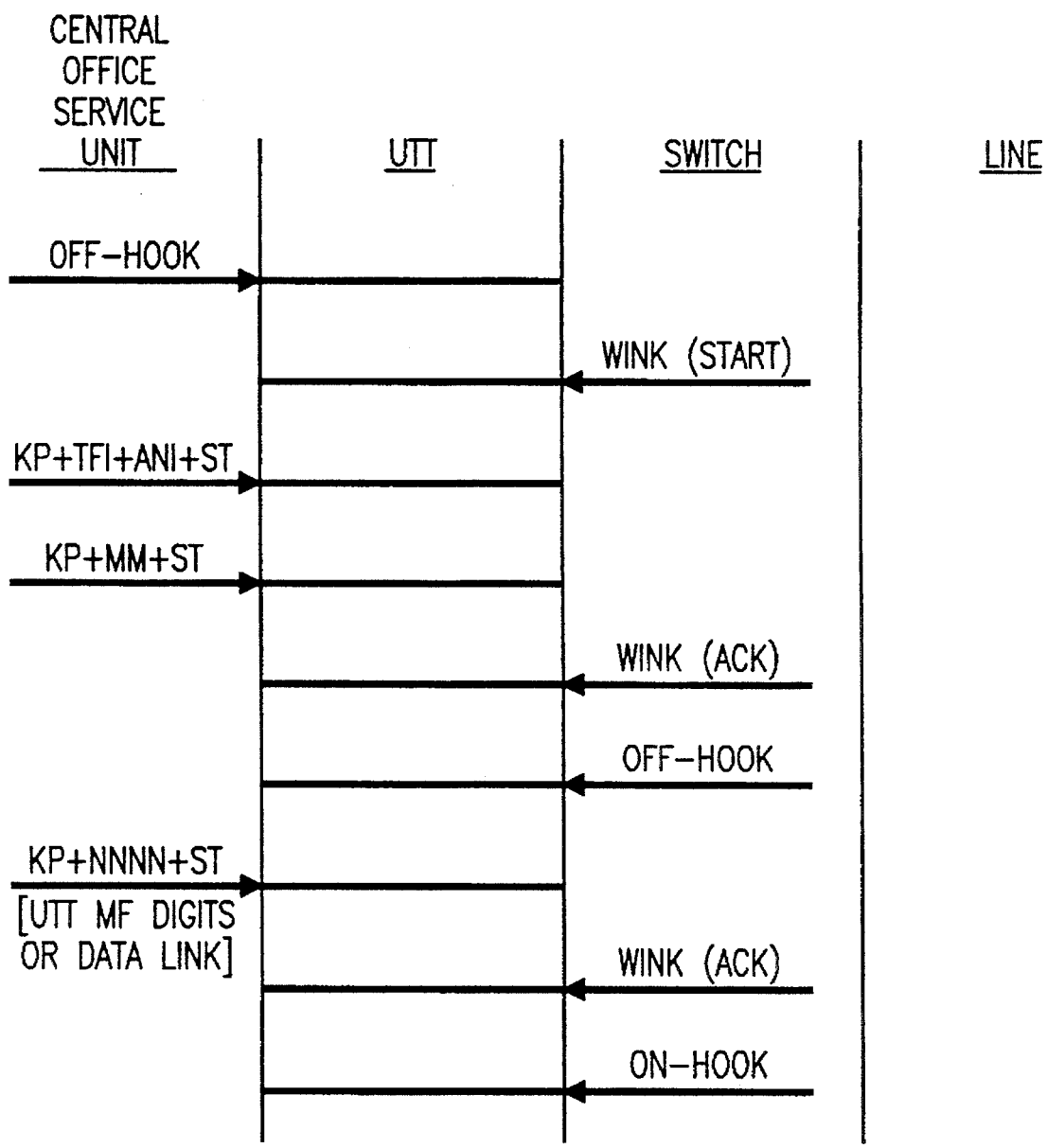

Refer to FIG. 6.

For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch also sends an Off-Hook. The COSU sends the switch the third information string. The switch acknowledges the third information string with a Wink (ACK) and an On-Hook. The COSU returns On-Hook to complete the signaling protocol.

5. Broadcast to CPE—Information To Switch

This and the following example identifies how the switch is instructed to broadcast a given message (text or data) to CPE. This example instructs the switch to broadcast a message to an identified list. The list of Directory Numbers, alert codes, and sub-addresses has already been stored in the switch memory. The third information string, in this protocol transaction, contains the information to be broadcast to each Directory Number. The information in the third string may also contain a time of day to broadcast the message or a priority rank of this information over other broadcast strings. The broadcast time element may be used for switch loading (traffic) constraints or emergency notification conditions.

The protocol for this example is:

KP+TFI+ANI+ST

KP+MM+ST

KP+NNNN+ST where:

TFI = Alert Function Sub-address (see Tables 1 and 2)
00 004 00

Alert=00 indicates no alert is sent by the switch. For broadcast applications, the alert code is contained in the broadcast list of Directory Numbers in the switch memory.

Function=004 indicates that the information contained in the third information string (NNNN) is to be considered the information to be transmitted to the CPE.

Sub-address=00 indicates there are no sub-addresses to be sent to the CPE. For broadcast applications, the sub-address is contained in the broadcast list of Directory Numbers in the switch memory. MM=indicates the broadcast list identifier. For example, 01 would identify list 1 and 02 would identify list 2.

NNNN=An information string, either binary or text information, to be broadcast to each Directory Number in list MM. An example of such a list is: ["Your air conditioner has been turned off and will be restored at 11:00 AM"]; [Binary data to be loaded into a meter reading device causing the device to provide every half hour reading data]

The broadcast function requires an identification to the COSU/ESP of the success or failure to deliver the information message and a method to request a status of the broadcast command from the switch.

Figure 7:
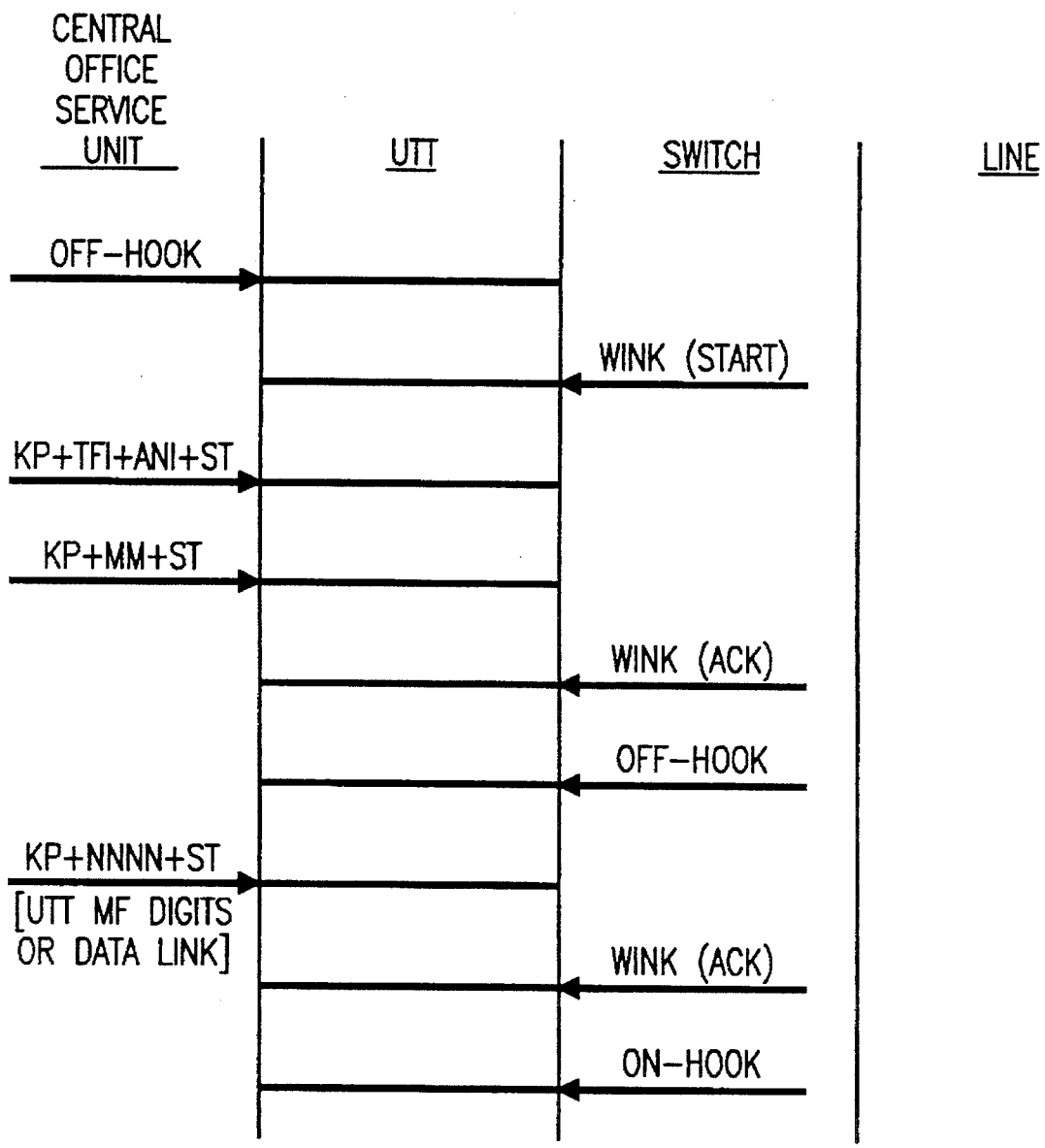

Refer to FIG. 7.

For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch also sends an Off-Hook. The COSU sends the switch the third information string. The switch acknowledges the third information string with a Wink (ACK) and an On-Hook. The COSU returns On-Hook to complete the signaling protocol.

6. Broadcast to CPE—Connect to CPE

This example identifies how the switch performs the actual broadcast function. The broadcast of information to the CPE is similar to example 2 "ESP data to CPE" except the function is performed multiple times corresponding to the number of Directory Numbers in the specified list. As indicated earlier, broadcast of the information string to various CPE indicated in the switch memory may take place at various times. Those times may be specified by the ESP (time of Day) or may occur as switch resources become available.

Figure 8:
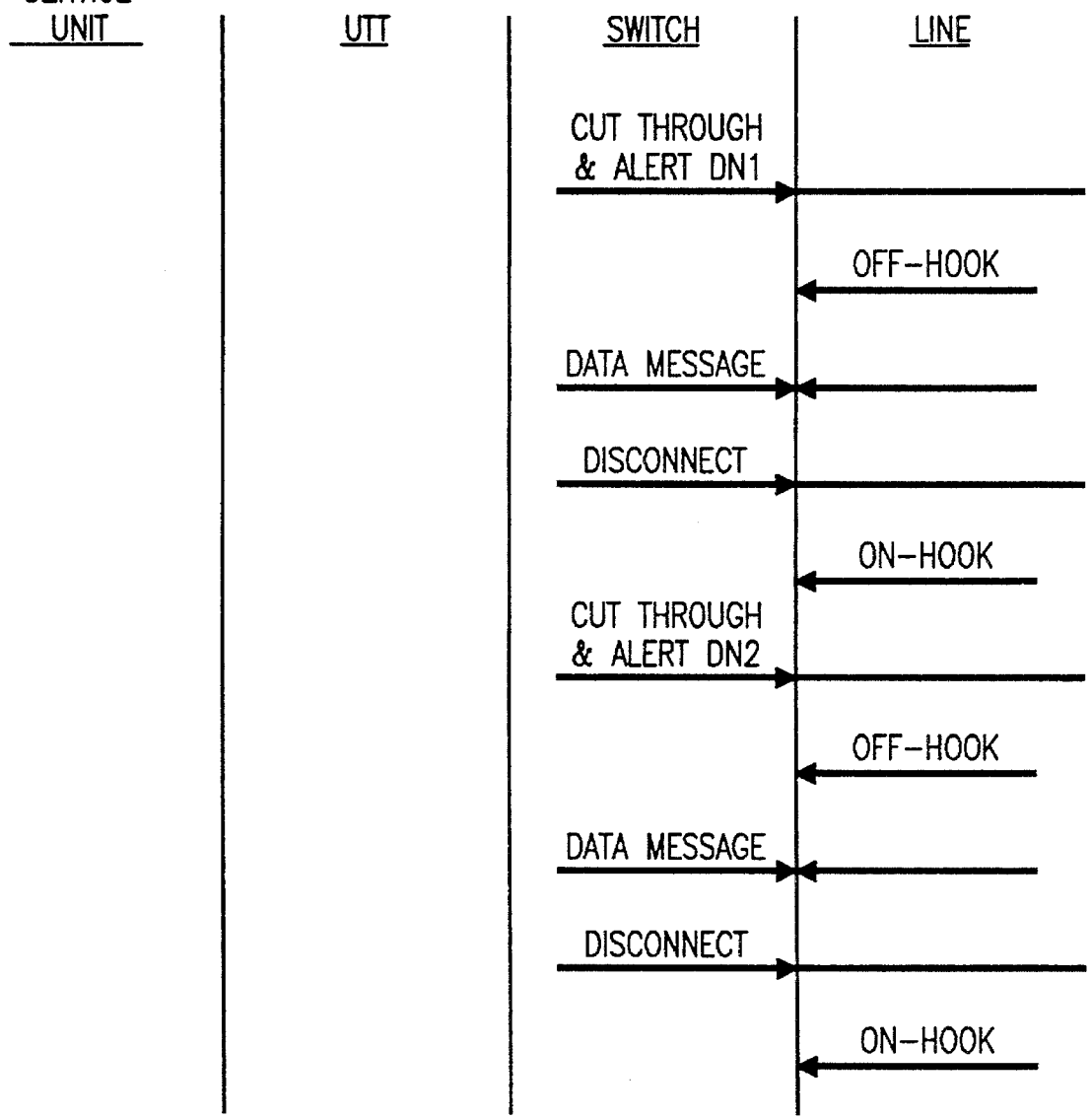

Refer to FIG. 8.

In this example, the switch initiates the broadcast process due to an ESP or internally generated request. The switch cuts through to the first Directory Number in the list to be connected to. Abbreviated ringing is sent, if indicated in the list of DN's to call. The line is alerted, and a-sub-address is sent. When an Off-Hook is received, the broadcast message is sent to the CPE. At the conclusion of the broadcast message, a Disconnect is sent to the CPE to clear the line. The CPE goes On-Hook. This cut through, alert and sub-address process is repeated until the broadcast list of DN's is exhausted.

If a Directory Number is Busy, the switch will retry to deliver the broadcast message X times before reporting a delivery failure to the ESP. Call Waiting can be a final attempt to deliver the message before delivery failure is recorded in memory. Delivery failure will be reported to the ESP by groups and not as individual Directory Numbers. If the end user has Call Waiting assigned to the line, the telemetry call will not activate Call Waiting or Caller ID on Call Waiting (CIDCW).

A Barge-In case is provided which allows the ESP to Barge-In on an existing conversation.

7. Utility/ESP Notification of Broadcast Success or Failure

The broadcast function requires an identification to the COSU/ESP of the success or failure to deliver the information message.

The protocol for this example is:

KP+TFI+ANI+ST

KP+MM+ST

KP+NNNN+ST where:

| TFI | = | Alert | Function | Sub-address (see Tables 1 and 2) |
|---|---|---|---|---|
| | | 00 | 006 | 00 |

Alert=00 indicates no alert is sent by the switch. In the switch to COSU direction, alert is an Off-Hook signal.

Function=006 indicates the information contained in the third information string (NNNN) is the status of the broadcast message.

Sub-address=00 indicates there are no sub-addresses. For broadcast status applications, the sub-address is contained with the broadcast list of Directory Numbers being reported in the information string NNNN.

MM=indicates the broadcast list identifier. For example, 01 would identify list 1 and 02 would identify list 2.

NNNN=An information string, either binary or text information, to be reported for each Directory Number contained in list MM.

An example of such a list is:[Success:DN 1, Subadd 4, DN 3, Subadd 1; Failure: DN 2, Subadd 1]

This report can take a variety of forms.

Figure 9:
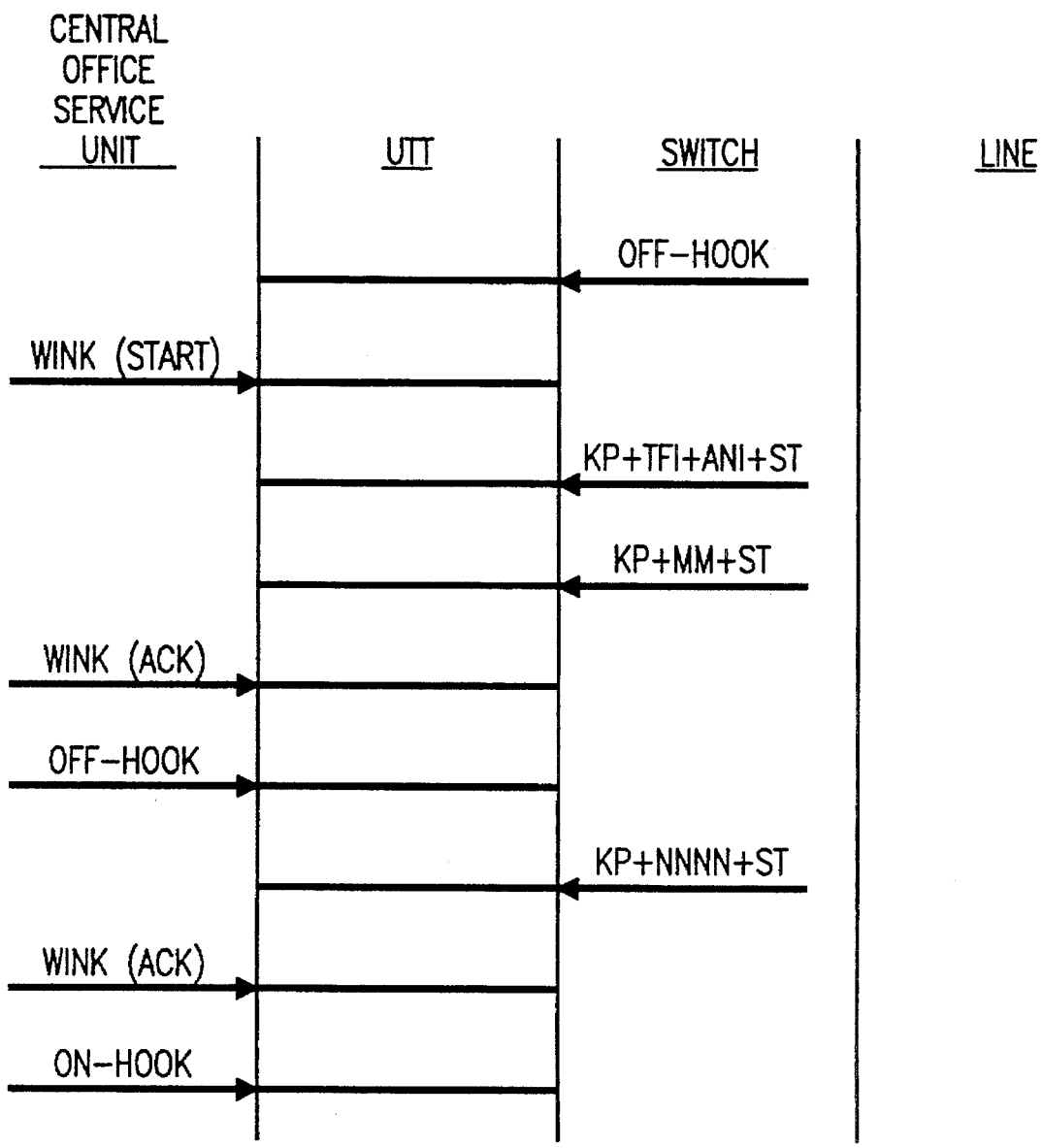

Refer to FIG. 9.

For this application, the switch initiates a UTT connection to the COSU by going Off-Hook. The COSU responds with a Wink (start). The switch sends the two strings of information which are acknowledged by a Wink (ACK). The COSU sends an Off-Hook to the switch. The switch then sends to the COSU the third information string. The COSU responds to the switch with a Wink (ACK) and On-Hook. The switch responds with an On-Hook to the COSU.

8. Utility/ESP Request Broadcast Status

The COSU/ESP also requires a method to request from the switch a status of the broadcast command.

In response to this request for status, example 7 "ESP notification of Broadcast Success or Failure" would be sent to the COSU/ESP.

The protocol for this example is:

KP+TFI+ANI+ST

KP+MM+ST where:

| TFI | = | Alert | Function | Sub-address (see Tables 1 and 2) |
|---|---|---|---|---|
| | | 00 | 007 | 00 |

Alert=00 indicates no alert is sent by the switch.

Function=007 indicates a broadcast status report is requested for broadcast list MM.

Sub-address=00 indicates there are no sub-addresses.

MM=indicates the broadcast list identifier. For example, 01 would identify list 1 and 02 would identify list 2.

Figure 10:
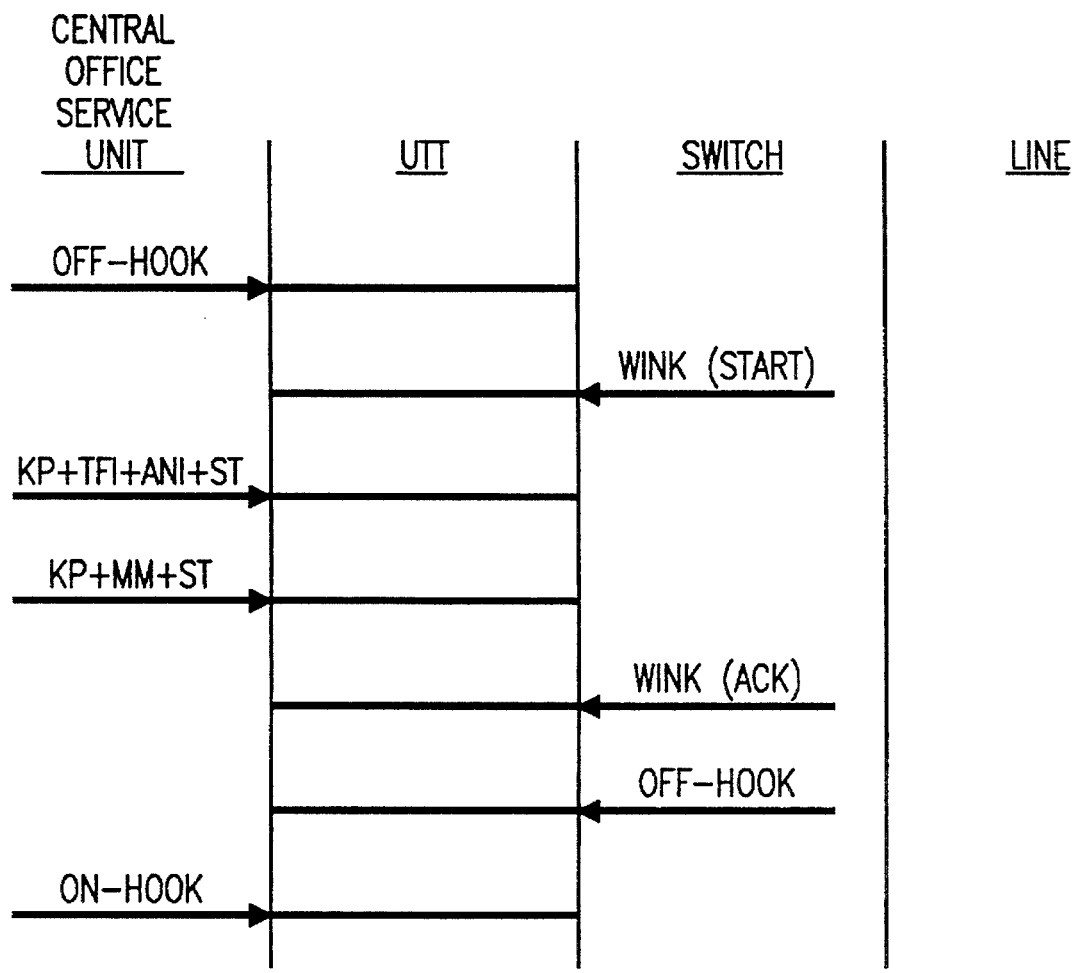

Refer to FIG. 10.

For this application, the utility/ESP connects to the COSU using a variety of connection means. The COSU initiates a UTT connection to the switch by going Off-Hook. The switch responds with a Wink(start). The COSU sends the two strings of information which are acknowledged by a Wink (ACK). The switch responds with a Wink (ACK) and Off-Hook. The COSU completes the protocol by sending the switch an On-Hook signal.

9. Broadcast to CPE—Information to Switch (ADSI type CPE)

This and the following example identifies how the switch is instructed to broadcast a given message (text or data) to CPE and interact with additional switch capabilities to complete the call. This example instructs the switch to broadcast a message to an identified list.

In this example, the telemetry feature, after providing the connection, CPE On-Hook alerting signal and sub-address to the CPE, gives line side control to the ADSI capability. The ADSI capability provides the ADSI alert. The message is delivered to the ADSI CPE. This is similar to example 3. The list of Directory Numbers, alert codes, and sub-addresses has previously been stored in the switch memory. The third information string, in this protocol transaction, contains the information to be broadcast to each Directory Number. The information in the third string may also contain a time of day to broadcast the message or a priority rank of this information over other broadcast strings.

The protocol for this example is:

KP+TFI+ANI+ST

KP+MM+ST

KP+NNNN+ST where:

| TFI | = | Alert | Function | Sub-address (see Tables 1 and 2) |
|---|---|---|---|---|
| | | 00 | 005 | 00 |

Alert=00 indicates no alert is sent by the switch. For broadcast applications, the alert code is contained in the broadcast list of Directory Numbers in the switch memory.

Function=005 indicates that the information contained in the third information string (NNNN) is to be considered the information to be transmitted to the CPE.

Sub-address=00 indicates there are no sub-addresses to be sent to the CPE. For broadcast applications, the sub-address is contained in the broadcast list of Directory Numbers in the switch memory.

MM=indicates the broadcast list identifier. For example, 01 would identify list 1 and 02 would identify list 2.

NNNN=An information string, either binary or text information, to be broadcast to each Directory Number in list MM. Examples of such a list is: ["Your requested feature, Call Blocking, has been installed for your use as of 10:30 AM today, May 3, 1993"]; ["Repair service has completed scheduled repairs to your telephone line. Thank you for using ———"]

The data string may contain a time of day to broadcast the message or a priority code indicating the priority of this broadcast compared to other broadcast strings. This may be used for switch considerations or emergency notification conditions.

Figure 11:
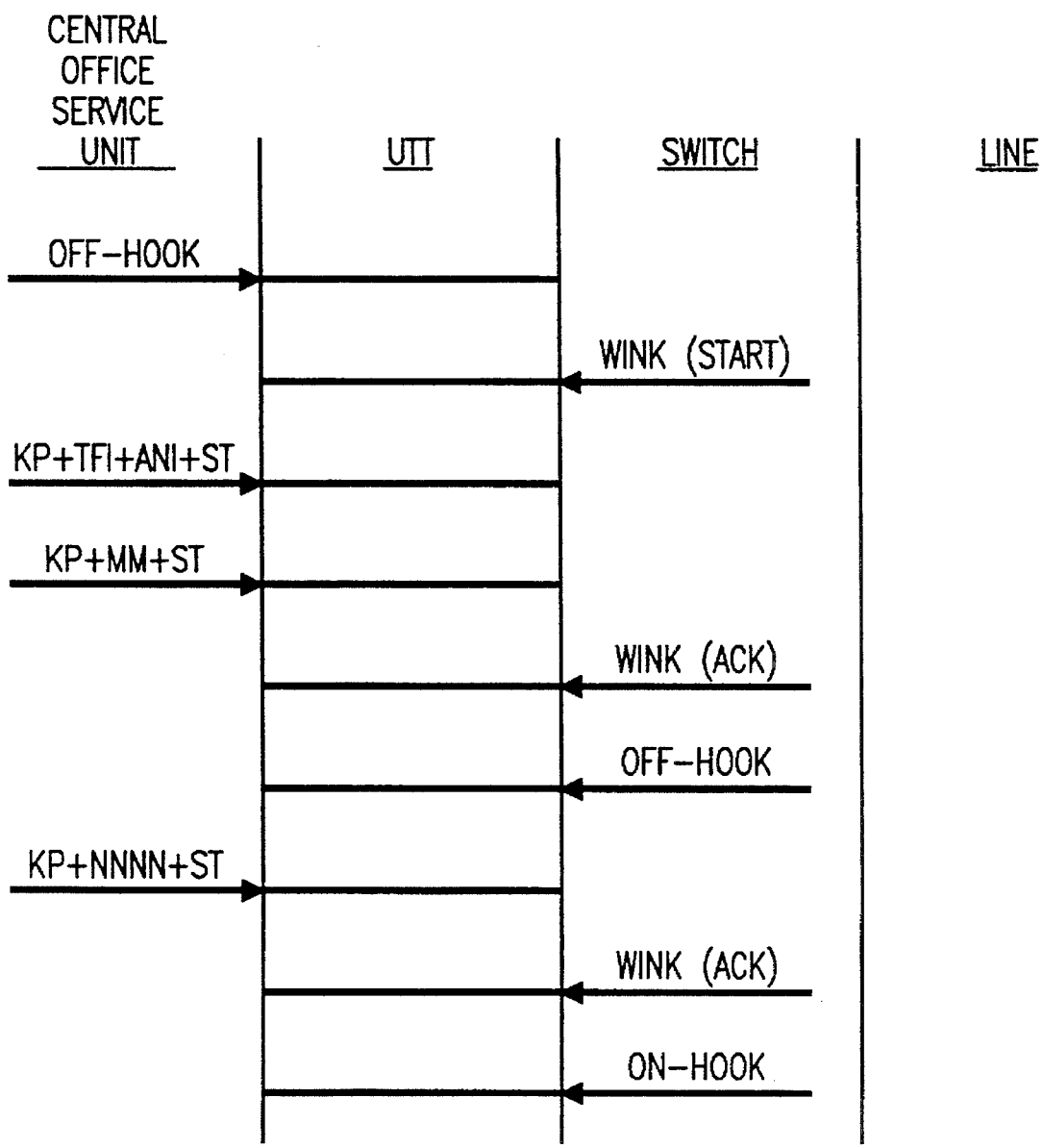

Refer to FIG. 11.

For this application, the utility/ESP connects to the COSU using a variety of connection means. The COSU initiates a UTT connection to the switch by going Off-Hook. The switch responds with a Wink(start). The COSU sends the two strings of information which are acknowledged by a Wink (ACK). The switch also sends an Off-Hook. The COSU sends the switch the third information string. The switch acknowledges the third information string with a Wink (ACK) and an On-Hook. The COSU returns On-Hook to complete the signaling protocol.

10. Broadcast to CPE—Connect to CPE (ADSI type CPE)

This example identifies how the switch performs the actual broadcast function. The broadcast of information is similar to example 3 "ESP data to CPE" except the function is performed multiple times corresponding to the number of Directory Numbers in the specified list. As indicated earlier, broadcast of the information string to various CPE indicated in the switch memory may take place at various times. Those times may be specified by the ESP (time of Day) or may occur as switch resources become available.

In this example, broadcast to ADSI CPE requires the interaction of the telemetry feature and the ADSI feature to complete the call. The telemetry feature, after providing the connection, CPE On-Hook alerting signal and sub-address to the CPE, gives line side control to the ADSI capability. The ADSI capability provides the ADSI alert. The message is delivered to the ADSI CPE. Control is then returned to the telemetry feature to deliver another ADSI message. This iterative process is continued until all Directory Numbers have been accessed or sufficient connect tries have been made to the CPE.

Figure 12:
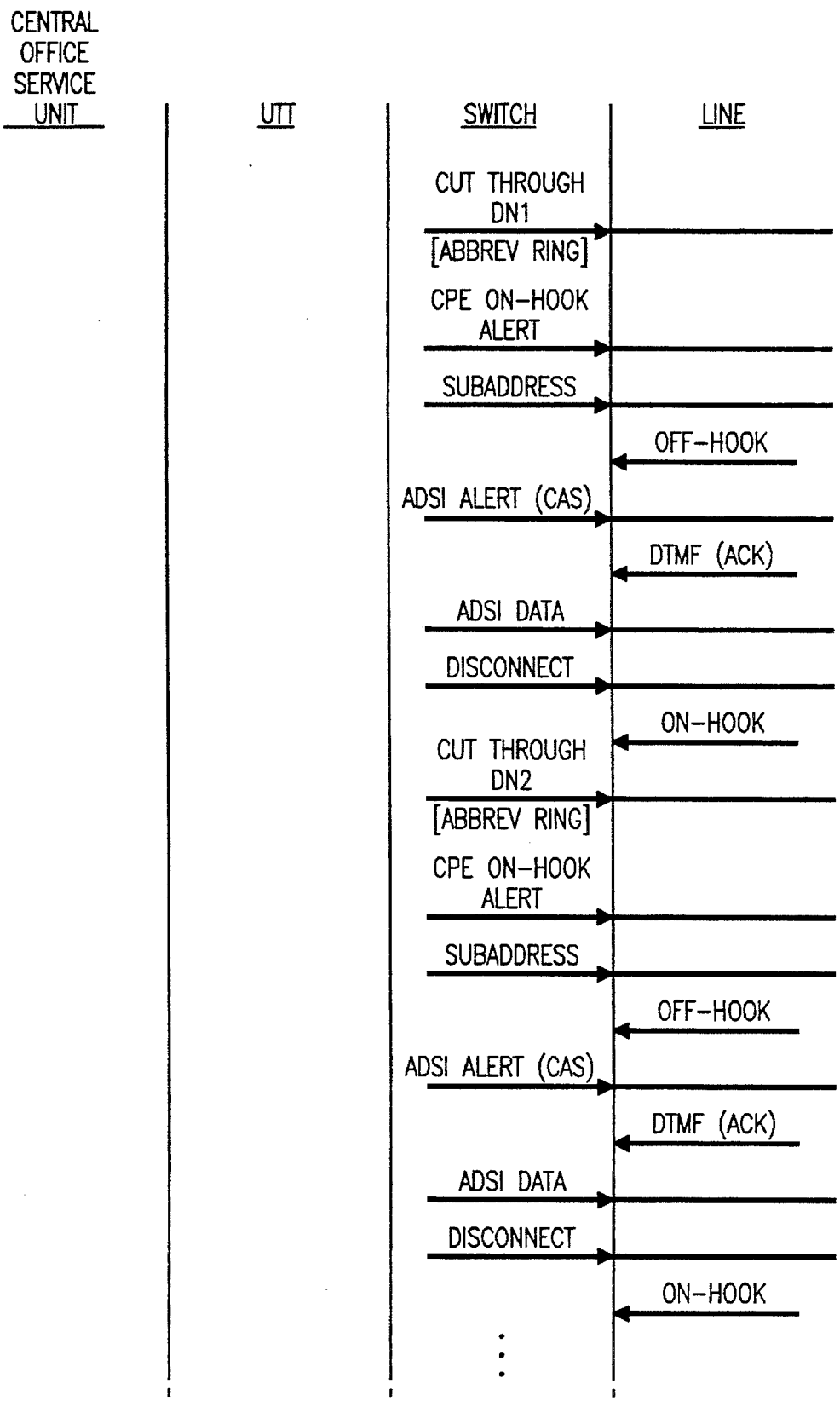

Refer to FIG. 12.

In this example, the switch initiates the broadcast process due to an ESP or internally generated request. The switch cuts through to the first Directory Number in the list to be connected to. Abbreviated ringing is sent, if indicated in the list of DN's to call. The line is sent the CPE On-Hook alert signal and sub-address. When an Off-Hook is received, the ADSI alert (CAS) is sent to the CPE. A DTMF (ACK) is received from the ADSI CPE. The ADSI message is sent to the ADSI CPE. At the conclusion of the ADSI broadcast message, a Disconnect is sent to the CPE to clear the line. The CPE goes On-Hook. This cut through, CPE On-Hook alert, sub-address, ADSI alert signal, receipt of DTFM (ACK), ADSI data to CPE, and Disconnect process is repeated until the broadcast list of DN's is exhausted.

If a Directory Number is Busy, the switch will retry to deliver the broadcast message X times before reporting a delivery failure to the ESP. Call Waiting can be a final attempt to deliver the message before noting the delivery failure in memory. Delivery failure will be reported to the ESP by groups and not as individual Directory Numbers.

If the end user has Call Waiting assigned to the line, the telemetry call will not activate Call Waiting but will retry the Directory Number again at a later time.

A Barge-In case is provided which allows the ESP to Barge-In on an existing conversation.

11. Voice Message to CPE

This example is similar to the second example except the switch provides a power ring alert and sub-addressing in the silent interval of the ringing signal. When the CPE goes Off-Hook, the switch indicates Off-Hook to the COSU.

Applications for this technique are delivery of voice messages directly analogous to delivery of telemetry data. ESP's will be capable of delivering voice messages even if their clients have their calls forwarded to another destination. Since the switch has control of the CPE alert function and sub-address, the switch can internally initiate calls for such things as broadcast to various voice message devices, Operation Systems testing of CPE, Operations Systems or service order initiated changes to CPE, or other switch initiated communications functions with voice message confirmation.

The protocol for this example is:

KP+TFI+ANI+ST

KP+DN+ST

Voice Message where:

| TFI = | Alert | Function | Sub-address (see Tables 1 and 2) |
|---|---|---|---|
| | 01 | 008 | 05 |

Alert=01 indicates the switch is to send a power ringing signal to the line.

Function=008 indicates that, if the CPE is On-Hook, the switch is to power ring the CPE based on the alert signal defined above, the switch is to return Busy if the line is Busy, an Off-Hook is to be returned from the CPE after it is alerted and the sub-address received, and there is no third information string.

Sub-address=05 indicates a sub-address of 5 will be sent to the CPE in the silent interval of ringing (indicating, for example, extension 5 at the specified Directory Number). Upon receiving the sub-address the CPE (at sub-address 5) will go Off-Hook.

ST (first string)=indicates only two sub-address digits are present

Figure 13:
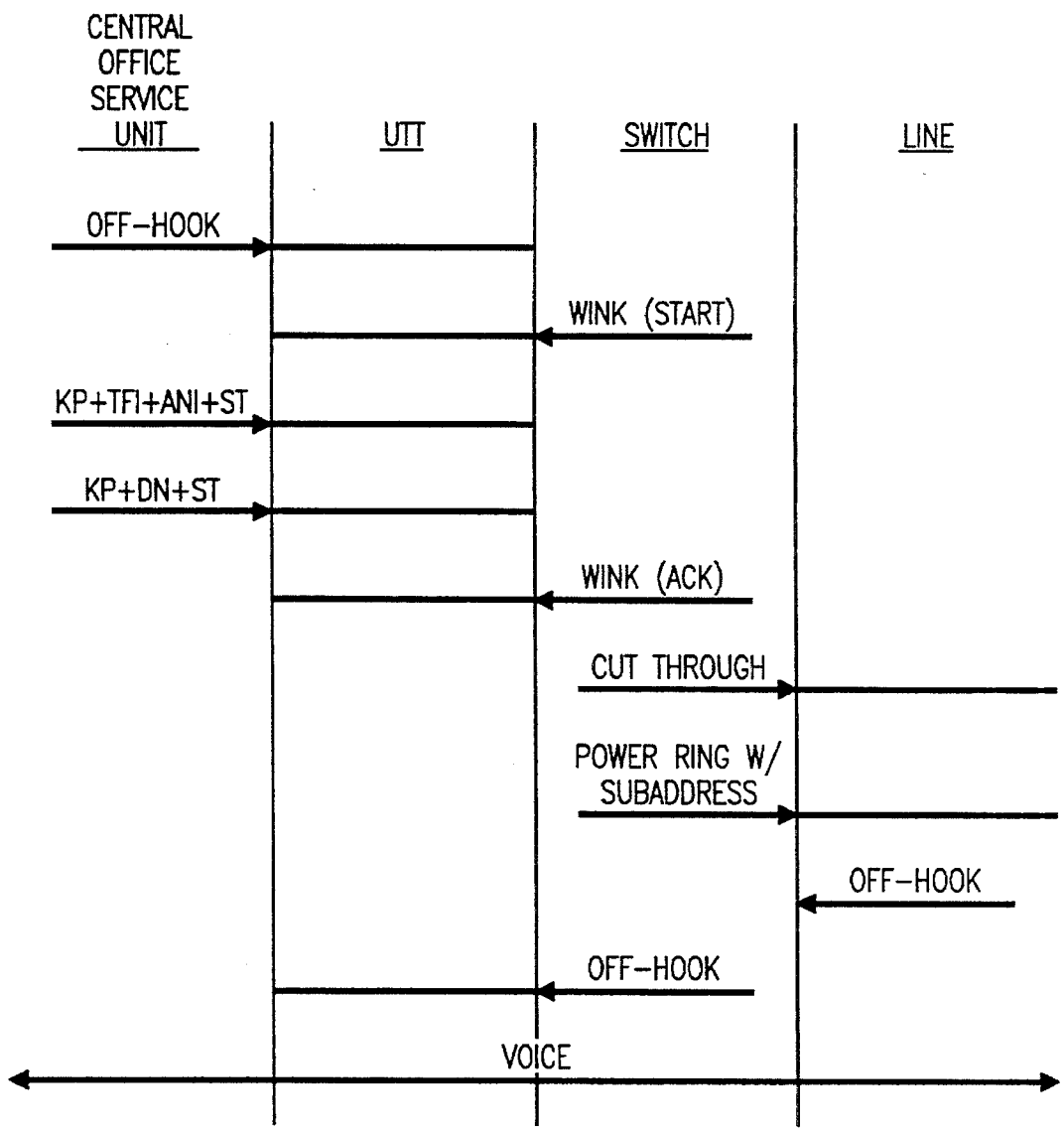

Refer to FIG. 13.

For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch cuts through to the end user's line, sending abbreviated ringing, if instructed. The switch then sends power ringing and the sub-address in the silent interval of power ringing. If the CPE device is present (answering machine) or the end user picks up the CPE, the CPE goes Off-Hook. The switch returns Off-Hook to the COSU. The COSU and CPE exchange data.

If the CPE is already Off-Hook, Busy will be returned to the COSU since there is no knowledge as to which CPE sub-address is Off-Hook. Rather than provide a false indication of the correct device being Off-Hook, a Busy is returned.

After the switch returns Off-Hook to the COSU, data is exchanged between the ESP and CPE.

If the end user has Call Waiting assigned to the line, the telemetry call will not activate Call Waiting or Caller ID on Call Waiting (CIDCW).

A Barge-In case is provided which allows the ESP to barge-in on existing conversations.

12. Voice Message Broadcast to CPE—Information to Switch

This and the following example identifies how the switch is instructed to broadcast a voice message to CPE. This example instructs the switch to broadcast a voice message to an identified list. The list of Directory Numbers, alert codes, and sub-addresses has already been stored in the switch memory. The voice information is communicated to the switch after the second protocol string. The voice message is stored in the switch (or auxiliary devices) until the switch is ready to broadcast the voice message to each directory number. A third protocol string may be implemented to communicate to the switch information for a time of day to broadcast the message or a priority rank of this information over other broadcast strings. This time of day information is not illustrated here and would require the assignment of another TFI function code to identify there is another protocol string present. The broadcast time element may be used for switch loading (traffic) constraints or emergency notification conditions.

The protocol for this example is:

KP+TFI+ANI+ST

KP+MM+ST

Voice Message where:

| TFI | = | Alert | Function | Sub-address (see chart 1 and 2) |
|-----|---|-------|----------|--------------------------------|
|     |   | 00    | 009      | 00                             |

Alert=00 indicates no alert is sent by the switch. For broadcast applications, the alert code is contained in the broadcast list of Directory Numbers in the switch memory.

Function=009 indicates that the voice information sent after the second protocol string is the information to be transmitted to the CPE.

Sub-address=00 indicates there are no sub-addresses to be sent to the CPE. For broadcast applications, the sub-address is contained in the broadcast list of Directory Numbers in the switch memory.

MM=indicates the broadcast list identifier. For example, 01 would identify list 1 and 02 would identify list 2.

An example of a voice message to CPE is: ["Your air conditioner has been turned off and will be restored at 11:00 AM"]

The broadcast function requires an identification of the COSU/ESP of the success or failure to deliver the information message and a method to request a status of the broadcast command from the switch.

Figure 14:
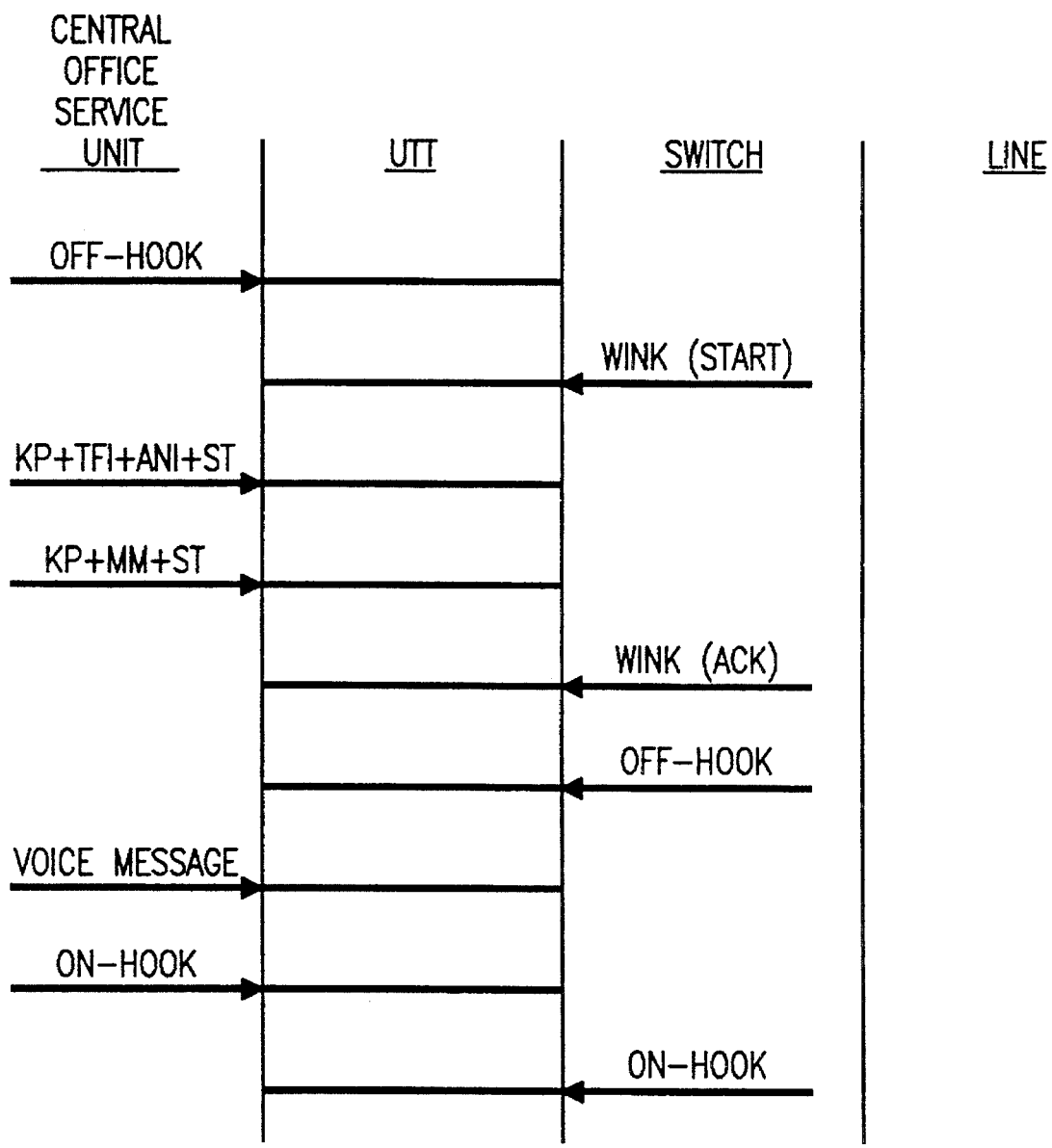

Refer to FIG. 14.

For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch also sends an Off-Hook. The ESP/COSU send a voice message to the switch. This information is stored in the switch memory or some other auxiliary device. The call is terminated by the COSU sending On-Hook to the switch. The switch sends On-Hook to the COSU to complete the protocol.

13. Voice Message Broadcast to CPE—Connect to CPE

This example identifies how the switch performs the actual voice message broadcast function.

The broadcast of information to the CPE is similar to the previous broadcast example. The voice message delivery to CPE function is performed multiple times corresponding to the number of Directory Numbers in the specified list.

As indicated earlier, broadcast of the voice information to various CPE indicated in the switch memory may take place at various times. Those times may be specified by the ESP (time of Day) or may occur as switch resources become available.

Figure 15:
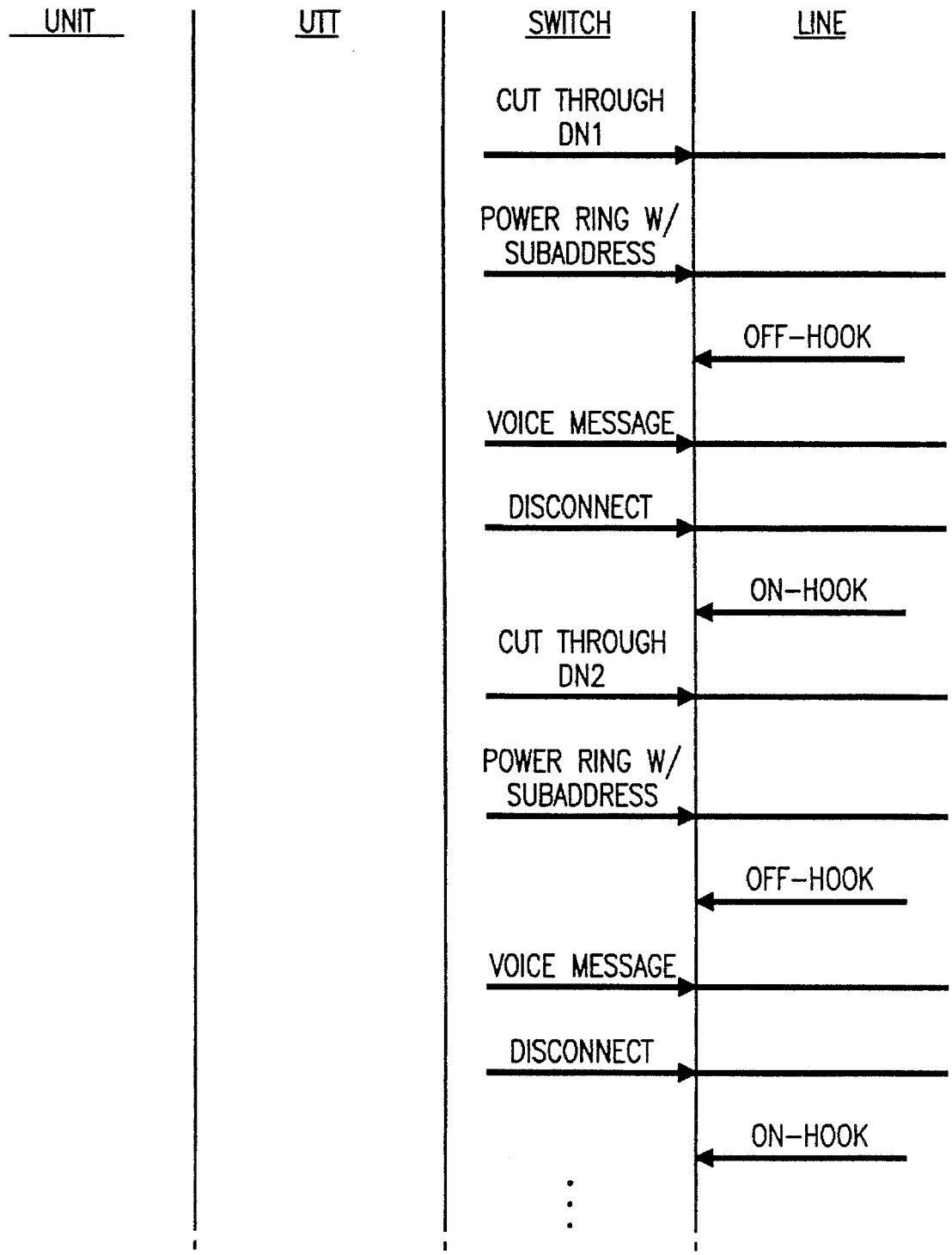

Refer to FIG. 15.

In this example, the switch initiates the broadcast process due to an ESP or internally generated request. The switch cuts through to the first Directory Number in the list to be connected to. Power ringing is sent to the CPE with the sub-address in the silent interval. When an Off-Hook is received, the voice broadcast message is sent to the CPE. At the conclusion of the broadcast message, a Disconnect is sent to the CPE to clear the line. The CPE goes On-Hook. This cut through, power ring and sub-address process is repeated until the broadcast list of DN's is exhausted.

If a Directory Number is Busy, the switch will retry to deliver the broadcast message X times before reporting a delivery failure to the ESP. Call Waiting can be a final attempt to deliver the message before delivery failure is recorded in memory. Delivery failure will be reported to the ESP by groups and not as individual Directory Numbers.

If the end user has Call Waiting assigned to the line, the telemetry call will not activate Call Waiting or Caller ID on Call Waiting (CIDCW).

A Barge-In case is provided which allows the ESP to Barge-In on an existing conversation.

The invention has been described with particular attention to it preferred embodiment; however, it should be understood that variations and modifications within the spirit and scope of the invention may occur to those skilled in the art to which the invention pertains. For example, the principles of this invention may be practiced in analog and/or digital switching and transmission environments; and may be applied in ISDN networks.

What is claimed is:

1. A communication switching system comprising:
   one or more switching offices wherein each office comprises:
      a switching network (23) comprising:
         a plurality of line ports for connection to subscriber lines;
         a plurality of trunk ports for connection to other switching offices and to utility facilities;
         switching means for selectively interconnecting said line and trunk ports; and
         network control means for controlling said switching means;
      a stored program control processor (SPCS) (26, 27,28) comprising:
         input means coupled to said line and trunk ports for receiving supervisory, control, and call signalling information from said line and trunk ports; and
         control means for controlling said network control means in accordance with received supervisory, call signalling and control information;
   CHARACTERIZED IN THAT
      certain of said trunk ports which are connected to utility facilities (20, 70) are assigned a class of service that dictates that said stored program control processor (SPCS), in addition to supervisory and call signalling information, is to receive instructions for serving requests for voice, data, and administrative calls from said utility facilities.

2. A communication switching system in accordance with claim 1
CHARACTERIZED IN THAT
customer premises equipment (CPE) respectively associated with certain ones of said subscriber lines comprises a telemetry interface unit and one or more telemetry/voice devices controlled by said telemetry interface units in accordance with calling signals received over its associated subscriber line; and said instructions identify the source and type of calling signals to be employed in serving the instruction.

3. A communication switching system in accordance with claim 2
CHARACTERIZED IN THAT
said calling signals comprise alerting signals and optional sub-addresses.

4. A communication switching system in accordance with claim 3
CHARACTERIZED IN THAT
the possible sources of alerting signals comprise: said utility facilities (20,70) and said control processor (26, 27, 28).

5. A communication switching system in accordance with claim 3
CHARACTERIZED IN THAT
the possible types of alerting comprise: suppressed ringing, power ringing, and tones.

6. A communication switching system in accordance with claim 1
CHARACTERIZED IN THAT
certain of said instructions specify that connection to a line port is to be made independently of the supervisory state i.e., on-hook of off-hook state of CPE connected to the line port; and others of said instructions specify that connection to a line port is to be made only if CPE connected to the line port is in the on-hook state.

7. A communication switching system in accordance with claim 1
CHARACTERIZED IN THAT
certain of said instructions specify that the SPCS, for the duration of a connection to a line port, is to monitor the connection for on-hook or off-hook transitions of CPE connected to the port; and others of said instructions specify that the SPCS, for the duration of a connection to a line port, is not to monitor the connection for on-hook or off-hook transitions of CPE connected to the port.

8. A communication switching system in accordance with claim 1
CHARACTERIZED IN THAT
certain of said instructions specify that the SPCS is to invoke other switch based services with respect to CPE identified in said certain instructions.

9. A communication switching system in accordance with claim 8
CHARACTERIZED IN THAT
said other switch based services comprise Analog Display Services Interface (ADSI) services.

10. A communication switching system in accordance with claim 1
CHARACTERIZED IN THAT
certain of said instructions comprise broadcast instructions that specify that the SPCS is to broadcast messages to identified CPE.

11. A communication switching system in accordance with claim 10
CHARACTERIZED IN THAT
certain of said broadcast instructions specify that the SPCS is to store a list of records of subscriber lines as an identified list in the memory of said SPCS.

12. A communication switching system in accordance with claim 11
CHARACTERIZED IN THAT
the records of an identified list each comprise a plurality of fields which specify: the directory number of a subscriber line, alerting codes, sub-addresses, and other calling instructions.

13. A communication switching system in accordance with claim 1
CHARACTERIZED IN THAT
certain of said broadcast instructions specify that the SPCS is to transmit a message, included in the instruction, to CPE of a specified identified list of subscriber lines.

14. A communication switching system in accordance with claim 13
CHARACTERIZED IN THAT
a message to be transmitted may be a voice message or a telemetry message.

15. A communication switching system in accordance with claim 1
CHARACTERIZED IN THAT
said instructions to an SPCS comprise:
a first data string comprising: KP+TFI+ANI+ST wherein KP is a beginning of message signal; TFI is a coded instruction to said SPCS; ANI is the billing directory number; and ST is an end of string signal; and a second data string comprising: KP+7/10DN/Directive+ST wherein 7/10DN is a 7 or 10 digit directory number; and Directive identifies information stored, or to be stored, by said SPCS.

16. A communication switching system in accordance with claim 15
CHARACTERIZED IN THAT
in said instructions to an SPCS, TFI is of the form XX YYY ZZZZ wherein; XX identifies one of a set of possible alerting codes; YYY identifies one of a set of possible function codes; and ZZZZ comprises a sub-address code.

17. A communication switching system in accordance with claim 15
CHARACTERIZED IN THAT
certain of said instructions to an SPCS further comprise; a third data string comprising: KP+NNN+ST wherein: NNN is a variable length string of information.

18. A communication switching system in accordance with claim 17
CHARACTERIZED IN THAT
NNN, said variable length string of information, is a list of directory numbers to be called.

19. A communication switching system in accordance with claim 17
CHARACTERIZED IN THAT
NNN, said variable length string of information, identifies a predefined function to be performed.

* * * * *